US009932451B2

(12) United States Patent
Maeda et al.

(10) Patent No.: US 9,932,451 B2
(45) Date of Patent: Apr. 3, 2018

(54) POLYESTER COMPOSITION FOR MASTERBATCH

(71) Applicant: TOYOBO CO., LTD., Osaka-shi, Osaka (JP)

(72) Inventors: Kunihiro Maeda, Tsuruga (JP); Hideto Ohashi, Tsuruga (JP); Satoru Nakagawa, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/303,393

(22) PCT Filed: Apr. 8, 2015

(86) PCT No.: PCT/JP2015/060934
§ 371 (c)(1),
(2) Date: Oct. 11, 2016

(87) PCT Pub. No.: WO2015/159771
PCT Pub. Date: Oct. 22, 2015

(65) Prior Publication Data
US 2017/0029575 A1 Feb. 2, 2017

(30) Foreign Application Priority Data
Apr. 14, 2014 (JP) .................................. 2014-082808

(51) Int. Cl.
*C08J 3/22* (2006.01)
*C08G 63/16* (2006.01)
*C08L 67/00* (2006.01)
*C08J 5/18* (2006.01)
*C08K 3/08* (2006.01)
*C08K 5/521* (2006.01)

(52) U.S. Cl.
CPC ................ *C08J 3/22* (2013.01); *C08G 63/16* (2013.01); *C08J 5/18* (2013.01); *C08K 3/08* (2013.01); *C08K 5/521* (2013.01); *C08L 67/00* (2013.01); *C08J 2367/02* (2013.01); *C08K 2003/0825* (2013.01)

(58) Field of Classification Search
CPC . C08J 3/22; C08J 5/18; C08J 2367/02; C08K 3/08; C08K 5/521; C08K 2003/0825; C08G 63/16; C08L 67/00
See application file for complete search history.

(56) References Cited

U.S. PATENT DOCUMENTS

| 2004/0191493 A1* | 9/2004 | Hayakawa | B29C 55/06 |
| | | | 428/220 |
| 2009/0207490 A1 | 8/2009 | Moriyama et al. | |
| 2012/0088112 A1 | 4/2012 | Ito et al. | |
| 2015/0087762 A1* | 3/2015 | Nakagawa | C08J 5/18 |
| | | | 524/493 |

FOREIGN PATENT DOCUMENTS

| JP | S59-214618 A | 12/1984 |
| JP | S59-227927 A | 12/1984 |
| JP | 2003-096169 A | 4/2003 |
| JP | 2003-165832 A | 6/2003 |
| JP | 2006-249213 A | 9/2006 |
| JP | 2007-039660 A | 2/2007 |
| JP | 2007-196679 A | 8/2007 |
| JP | 2008-063479 A | 3/2008 |
| JP | 2008-201822 A | 9/2008 |
| JP | 2010-285527 A | 12/2010 |
| WO | WO 2010-140575 A1 | 12/2010 |
| WO | WO2013146524 A1 * | 10/2013 |

OTHER PUBLICATIONS

Japanese Patent Office, International Search Report in International Patent Application No. PCT/JP2015/060934 (dated May 19, 2015).
Chinese Patent Office, the First Office Action in Chinese Patent Application No. 201580019964.3 (dated Sep. 28, 2017).

* cited by examiner

*Primary Examiner* — Robert Jones, Jr.
(74) *Attorney, Agent, or Firm* — Leydig, Voit & Mayer, Ltd.

(57) ABSTRACT

The present invention is a polyester composition for a masterbatch, which comprises a polyester, a magnesium compound, an alkali metal compound and a phosphorus compound, wherein magnesium atoms, alkali metal atoms and phosphorus atoms are contained in amounts of 400 to 2700 ppm by mass, 40 to 270 ppm by mass and 200 to 1700 ppm by mass, respectively, in the polyester composition, the melt resistivity of the polyester composition is $0.005 \times 10^8$ to $0.05 \times 10^8$ Ω·cm, and few contaminant particles are observed in the polyester composition under specified conditions. The polyester composition for a masterbatch has a satisfactorily low melt resistivity, contains few contaminant particles, and has an excellent color hue and excellent thermal stability.

20 Claims, No Drawings

POLYESTER COMPOSITION FOR MASTERBATCH

CROSS-REFERENCE TO RELATED APPLICATIONS

This patent application is the U.S. national phase of International Patent Application No. PCT/JP2015/060934, filed Apr. 8, 2015, which claims the benefit of Japanese Patent Application No. 2014-082808, filed on Apr. 14, 2014, which are incorporated by reference in their entireties herein.

FIELD OF THE INVENTION

The present invention relates to a polyester composition for masterbatch in order to improve film-forming properties by providing good electrostatic adhesion to a polyester film.

BACKGROUND ART

Polyesters are excellent in mechanical properties and chemical properties, and are used in broad fields including films and sheets for packaging, magnetic tapes, optics and the like. A polyester film is obtained by melt-extruding and then biaxially stretching a polyester. More specifically, a sheet-like object melt-extruded from an extruder is taken over in close contact with the surface of a rotating cooling drum (casting), and subsequently, the sheet-like object is introduced into a stretching roll arranged at a post-stage of the cooling drum, longitudinally stretched and further laterally stretched by a tenter, and then heat-set. Here, in order to enhance uniformity of the thickness of the film, and increase the casting speed, when cooling the sheet-like object melt-extruded from an extrusion nozzle on the surface of the rotary cooling drum, the sheet-like object and the drum surface need to closely contact each other with sufficiently high adhesion. Therefore, as a method for enhancing adhesion between the sheet-like object and the surface of the rotary drum, there has been widely used a method of providing a wire-shaped electrode between the extrusion nozzle and the rotary cooling drum, applying high voltage thereto, generating static electricity on the surface of the unsolidified sheet-like object, electrostatically depositing the sheet-like object on the surface of the cooling drum, and rapidly cooling the sheet-like object, that is, the so-called electrostatic adhesion casting method.

In the electrostatic adhesion casting method, it is known that increasing the charge amount on the surface of the sheet-like object is effective for improving electrostatic adhesion to the cooling drum of the sheet-like object, and reforming a polyester as a raw material to lower its melt resistivity is effective for increasing the charge amount. Moreover, as the method for lowering the melt resistivity, in a manufacturing stage of the raw material polyester, an alkali metal or alkaline earth metal compound is added during esterification or transesterification, for example (for example, refer to Patent Document 1).

As another method of lowering the melt resistivity, a masterbatch having a very low melt resistivity is separately produced by adding a large amount of an alkali metal or alkaline earth metal compound, and is mixed with a polyester as a raw material of the film (for example, refer to Patent Document 2). However, in the production of a masterbatch, there are problems that a contaminant is easily generated, coloring is easily caused, and thermal stability is lowered, by adding a large amount of an alkali metal or alkaline earth metal compound. Also, a sufficiently low value of the melt resistivity for a masterbatch cannot be obtained, and it is necessary to mix a large amount of masterbatch with the polyester of the film raw material. This is disadvantageous also in terms of cost.

PRIOR ART DOCUMENTS

Patent Documents

Patent document 1: Japanese Unexamined Patent Application Publication No. 2010-285527A1
Patent document 2: Japanese Unexamined Patent Application Publication No. 2008-201822A1

SUMMARY OF THE INVENTION

Problems to be Solved by the Invention

An object of the present invention is to provide a masterbatch polyester composition having a sufficiently low melt resistivity, little contaminant and excellent color hue and thermal stability, and a polyester film having enhanced electrostatic adhesion to a cooling drum and improved film-forming properties, and also excellent quality, by mixing this masterbatch polyester composition.

Solution to the Problems

The present inventors have extensively conducted studies and they resultantly found that the above-mentioned problems can be solved by means shown below and accomplished the present invention.

That is, the present invention is composed of the followings.

(i) A polyester composition for a masterbatch, which comprises a polyester, a magnesium compound, an alkali metal compound and a phosphorus compound, wherein 400 to 2700 ppm by mass as magnesium atoms, 40 to 270 ppm by mass as alkali metal atoms and 200 to 1700 ppm by mass as phosphorus atoms are contained in the polyester composition, and satisfies following (1) and (2).

$$\text{melt resistivity of the polyester composition} = 0.005 \times 10^8 \text{ to } 0.05 \times 10^8 \ \Omega \cdot \text{cm} \quad (1)$$

$$\text{IMA} \leq 10 \quad (2)$$

(where IMA is a number of contaminant particles with a particle size of 10 μm or more per 1 mm² of a visual field area observed from a sheet consisting of the polyester composition)

(ii) The polyester composition for a masterbatch according to (i), wherein the polyester in a polyester containing a dicarboxylic acid component and a glycol component as constituents, taking the amount of magnesium atoms as m (mol %), the amount of alkali metal atoms as k (mol %), and the amount of phosphorus atoms as p (mol %), based on the amount of the dicarboxylic acid component and satisfy the following formula (3).

$$2 \leq (m + k/2)/p \leq 3 \quad (3)$$

(iii) The polyester composition for a masterbatch according to (i) or (ii), wherein the alkali metal compound is potassium.

(iv) The polyester composition for a masterbatch according to any one of (i) to (iii), wherein the phosphorus compound is a phosphoric acid trialkyl ester and the trialkyl ester has alkyl groups having 2 to 4 carbon atoms.

(v) The polyester composition for a masterbatch according to any one of (i) to (iii), wherein the phosphorus compound is a triethyl phosphate.

(vi) A polyester composition for a film, wherein the polyester composition comprises the masterbatch polyester composition according to any one of (i) to (v).

(vii) A polyester film consists of the polyester composition for film according to (vi).

Effect of the Invention

The masterbatch polyester composition of the present invention having low melt resistivity, which is produced by adding specific amount of a magnesium compound, an alkali metal compound and a phosphorus compound improves film-forming properties of a film and further contains few contaminant particles, and has an excellent color hue and excellent thermal stability. Thus it is used in broad fields including packaging films and industrial films.

MODE FOR CARRYING OUT THE INVENTION

[Masterbatch Polyester Composition]

The masterbatch polyester composition of the present invention is mixed with a polyester resin for a film raw material, thereby forming a polyester composition for a film.

The masterbatch polyester composition of the present invention is required to have a melt resistivity of $0.005 \times 10^8$ to $0.05 \times 10^8$ Ω·cm. In order to improve film-forming properties of a polyester film, the polyester composition for a film desirably has a melt resistivity of $0.1 \times 10^8$ to $0.3 \times 10^8$ Ω·cm. When the masterbatch polyester composition has a melt resistivity higher than $0.05 \times 10^8$ Ω·cm, a large amount of masterbatch needs to be added for improving film-forming properties of the polyester for a film. Thus, there are problems such as low efficacy as a masterbatch and increase in production cost. When the masterbatch polyester composition has a melt resistivity lower than $0.005 \times 10^8$ Ω·cm, segregation is likely to occur since the amount of masterbatch added is too small, uneven melt resistivity of the film may be caused, and film-forming stability may be deteriorated. The masterbatch polyester composition more preferably has a melt resistivity of $0.005 \times 10^8$ to $0.025 \times 10^8$ Ω·cm.

A magnesium compound and an alkali metal compound are added to the masterbatch polyester composition of the present invention, for lowering melt resistivity. In addition, a phosphorus compound is added for dispersing these metal ion components in the polymer without becoming a contaminant and for further improving thermal stability.

As the magnesium compound used in the present invention, a known magnesium compound can be used. Examples include lower fatty acid salts such as magnesium acetate, and alkoxides such as magnesium methoxide, and any one of these may be used alone, or two or more kinds may be used in combination. Magnesium acetate is particularly preferred.

The amount of magnesium atoms is 400 to 2700 ppm based on the amount of the masterbatch polyester composition. When the amount of magnesium atoms is less than 400 ppm, the melt resistivity is increased, and a large amount of masterbatch needs to be added for improving film-forming properties of the polyester composition for a film. Thus, there are problems such as low efficacy as a masterbatch and increase in production cost. When the amount of magnesium atoms exceeds 2700 ppm, the amount of insoluble contaminant (magnesium salt) formed is increased, lowering of heat resistance is caused, and coloring of a film becomes severe, and thus, it is not preferred. A preferred amount of magnesium atoms is 450 to 2500 ppm, and a more preferred amount of magnesium atoms is 450 to 2000 ppm.

Examples of the alkali metal of the alkali metal compound used in the present invention include lithium, sodium, and potassium. Also, examples of the alkali metal compound include lower fatty acid salts such as lithium acetate and potassium acetate, and alkoxides such as potassium methoxide, and any one of these may be used alone, or two or more kinds may be used in combination. As the alkali metal, potassium has a large effect of lowering melt resistivity, and thus is preferred. As the alkali metal compound, an acetate is preferred, and potassium acetate is particularly preferred.

The amount of alkali metal atoms is 40 to 270 ppm based on the amount of the masterbatch polyester composition. When the amount of alkali metal atoms is less than 40 ppm, the melt resistivity is increased, and a large amount of masterbatch polyester needs to be added for improving film-forming properties of the polyester composition for a film. Thus, there are problems such as low efficacy as a masterbatch and increase in production cost. When the amount of alkali metal atoms exceeds 270 ppm, lowering of heat resistance is caused, and coloring of a film becomes severe, and thus, it is not preferred. A preferred amount of alkali metal atoms is 45 to 250 ppm, and a more preferred amount of alkali metal atoms is 45 to 200 ppm.

Examples of the phosphorus compounds used in the present invention include phosphoric acid, phosphorous acid, hypophosphorous acid, phosphonic acid, phosphinic acid, and ester compounds thereof. Examples include phosphoric acid, trimethyl phosphate, tributyl phosphate, triphenyl phosphate, monomethyl phosphate, dimethyl phosphate, monobutyl phosphate, dibutyl phosphate, phosphorous acid, trimethyl phosphite, tributyl phosphite, methylphosphonic acid, dimethyl methylphosphonate, dimethyl ethylphosphonate, dimethyl phenylphosphonate, diethyl phenylphosphonate, diphenyl phenylphosphonate, ethyl diethylphosphonoacetate, phosphinic acid, methylphosphinic acid, dimethylphosphinic acid, phenylphosphinic acid, diphenylphosphinic acid, methyl dimethylphosphinate, and methyl diphenylphosphinate. Among them, it is preferred to use a phosphoric acid triester having alkyl groups having 2 to 4 carbon atoms. Specific examples include triethyl phosphate, tripropyl phosphate, and tributyl phosphate, and any one of these may be used alone, or two or more kinds may be used in combination. Particularly, triethyl phosphate is considered to form a complex having interaction of appropriate strength with a magnesium ion, and is preferred since a polyester composition having a low melt resistivity, little contaminant and excellent color hue is obtained.

The amount of phosphorus atoms is 200 to 1700 ppm based on the amount of the masterbatch polyester composition. When the amount of phosphorus atoms is less than 200 ppm, magnesium ions and alkali metal ions are stabilized, and the effect of dispersing the ions in the polyester is lowered, and thus, the amount of insoluble contaminant formed is increased. Further, magnesium that has become a contaminant has no effect of lowering melt resistivity, and thus the melt resistivity is increased relative to the amount of magnesium added. Also, lowering of heat resistance is caused, and coloring of a film becomes severe, and thus, it is not preferred. When the amount of phosphorus atoms exceeds 1700 ppm, an excess phosphorus compound interacts with magnesium ions. Thus, the charge of magnesium ions does not contribute to the effect of lowering the melt resistivity, and the melt resistivity is increased relative to the amount of magnesium added, and thus, it is not preferred. A preferred amount of phosphorus atoms is 220 to 1000 ppm.

The contents of magnesium atoms, alkali metal atoms and phosphorus atoms in the masterbatch polyester composition can be quantitatively determined by the method described in the section of Examples described below. The time of addition of the magnesium compound, the alkali metal compound and the phosphorus compound to the polyester is not particularly limited. The compounds are added during polymerization of the polyester, particularly in the middle of the esterification step, or from a time point of completing the esterification step to the start of the polymerization step. This is preferred since the addition can suppress becoming a contaminant from a salt formed by an acid component of the polyester, a magnesium ion and an alkali metal ion, and the compounds can be uniformly dispersed in the oligomer.

When these compounds are added during polymerization of the polyester, magnesium atoms and alkali metal atoms remain in the polyester composition in almost the amount as added. However, phosphorus atoms may be distilled away from the polymerization system in a reduced pressure environment, and thus it is necessary to preliminarily grasp the relation between the addition amount and the remaining amount, and then determine the addition amount of the phosphorus compound.

When the polyester is a polyester containing a dicarboxylic acid component and a glycol component as constituents, taking the amount of magnesium atoms as m (mol %), the amount of alkali metal atoms as k (mol %), and the amount of phosphorus atoms as p (mol %), based on the amount of the dicarboxylic acid component, the molar ratio among the magnesium atoms, alkali metal atoms and phosphorus atoms satisfy the following formula (3), whereby the effect of the present invention is improved.

$$2 \leq (m+k/2)/p \leq 3 \quad (3)$$

It is considered that magnesium ions and alkali metal ions are stabilized by phosphorus atoms without becoming a contaminant. While a magnesium ion is divalent, an alkali metal ion is univalent. Thus, the sum of the amounts of magnesium ions and alkali metal ions is represented as (m+k/2), and the ratio obtained by dividing the sum by P "(m+k/2)/p" is defined as the relative amount of magnesium ions and alkali metal ions to phosphorus atoms.

When the value of the formula (3) exceeds 3, the amount of phosphorus atoms is small relative to the amount of magnesium atoms and alkali metal atoms, magnesium ions and alkali metal ions are stabilized, and the effect of dispersing the ions in the polyester is lowered, and thus, the amount of insoluble contaminant (magnesium salts and alkali metal salts) formed is increased. Further, magnesium that has become a contaminant has no effect of lowering melt resistivity, and thus the melt resistivity is increased relative to the amount of magnesium added. Also, lowering of heat resistance is caused, and coloring of a film becomes severe. When the value of the formula (3) is less than 2, the amount of phosphorus atoms is excessive relative to the amount of magnesium atoms and alkali metal atoms, and an excess phosphorus compound interacts with magnesium ions, and thus, the charge of magnesium ions does not contribute to the effect of lowering the melt resistivity, and the melt resistivity is increased relative to the amount of magnesium added. The value of "(m+k/2)/p" is more preferably not less than 2.3 and not more than 3, and further preferably not less than 2.5 and not more than 3.

The value of "(m+k/2)/p" in the formula (3) can be also calculated from the content of each atom in the masterbatch polyester composition.

The measurement method of IMA of the masterbatch polyester composition of the present invention will be described below. IMA corresponds to the number of contaminant particles (particles with a particle size of not less than 10 μm) in the masterbatch polyester composition.

For measurement of the number of contaminant particles in the masterbatch polyester composition of the present invention, a method of measuring the size and number of particles by image analysis from the image of particles in the polymer observed using a phase contrast optical microscope is used. The phase contrast optical microscope can convert slight delay (phase contrast) of a wavelength of the light transmitting objects with different refractive indexes into a contrast of light and darkness using diffraction and refraction of light, and thus is also suitable for observing contaminant particles appeared to be colorless and transparent in the polymer in common microscopy. The observed image is taken into an image analysis apparatus as an electronic data, and the size (equivalent area circle diameter) and number of particles can be measured.

In the observation of coarse particles with a phase contrast microscope, the visual field area and the depth of focus are determined according to the magnification of the used lens and the aperture, and thus a deviation of the measurement results is caused when the magnification of the used lens and the aperture are different. Also, the content of inorganic particles is large, and thus, in the case of a sample having small light transmittance, the brightness of the obtained image is low, and sufficient observation may not be possible with a lens with high magnification. Moreover, the thickness of the sample to be observed needs to be large enough relative to the focal depth of the objective lens. In order to satisfy these conditions, observation is carried out using an objective lens of a phase contrast microscope having a magnification of 10 and an aperture of 0.5 in the present invention.

The number of contaminant particles (IMA) in the masterbatch polyester composition of the present invention refers to the number of contaminant particles with a particle size of not less than 10 μm per 1 mm square, that is measured by the following procedures from the sheet of the polyester composition formed to have a thickness of 0.8 to 0.9 mm.

Measurement by an image analysis apparatus is carried out by the following procedures.

(1) The obtained image is converted to an electronic signal. The converted image data is a monochromatic image, and the contrast of the images is constituted of 256 gradations from 0 (perfect black) to 255 (perfect white).

(2) A binarization process that clearly partitions the boundary between the object (coarse inorganic particles) and background (polymer) of the image is carried out to give a binarized image with particles in white, and background in black (or reversely, particles in black, and background in white).

(3) The size (equivalent area circle diameter) and number of particles are calculated from the number of dots constituting the image.

The obtained result is data obtained by calculating the values in terms of unit area according to the scale of the actual image, and categorizing the number by particle size.

The measurement is usually carried out in 20 to 40 visual fields, and the measurement result is converted to the number per 1 mm square of the visual field area and used.

In the observation and measurement, it is preferred to properly adjust the density and resolution of the image, and the threshold in binarization, using a standard sample with known particle size and number of particles.

In the masterbatch polyester composition of the present invention, IMA (the number of contaminant particles with a particle size of not less than 10 μm) per 1 mm square measured by the above method needs to be not more than 10. When IMA exceeds 10, the particles become a contaminant on the surface of the film to impair the appearance and quality, and also the back pressure of the filter is increased by a contaminant further aggregated, accumulated and coarsened in the melting step in producing a polymer and a film, holes are formed in the film with the coarsened contaminant mixed in the film through the filter as the starting point, and thus stable production is not possible for a long period.

In order to have good appearance and quality and satisfy stable productivity when formed into the film, IMA of the masterbatch polyester composition of the present invention is preferably not more than 7/mm².

The contaminant in the present invention is an inorganic salt or organic salt in the polymerization system formed by a catalyst and a metal compound added for lowering melt resistivity, insolubilized, aggregated, and precipitated.

The polyester according to the present invention refers to one formed from one kind or two or more kinds selected from polycarboxylic acids including dicarboxylic acids and ester-forming derivatives thereof, and one kind or two or more kinds selected from polyhydric alcohols including glycols, one formed from hydroxycarboxylic acids and ester-forming derivatives thereof, or one formed from a cyclic ester.

The polyester can be produced by a conventionally known method.

For example, the polyester can be produced by either a method of esterifying terephthalic acid with ethylene glycol, and then polycondensing the product, or a method of trans-esterifying an alkyl ester of terephthalic acid such as dimethyl terephthalate with ethylene glycol, and then polycondensing the product. Also, the apparatus of polymerization may be of a batch type or continuous type.

As the catalyst, a metal-containing polyester polycondensation catalyst such as an antimony compound, an aluminum compound, a titanium compound, a tin compound or a germanium compound known as a polymerization catalyst of a polyester can be used. Among them, it is preferred to use an aluminum compound excellent in contaminant inhibition and thermal stability.

When an antimony compound is used, it is preferred that the masterbatch polyester composition contains 50 to 300 ppm by mass of antimony atoms. When an aluminum compound is used, it is preferred that the masterbatch polyester composition contains 20 to 100 ppm by mass of aluminum atoms. When a titanium compound is used, it is preferred that the masterbatch polyester composition contains 5 to 150 ppm by mass of titanium atoms. When a tin compound is used, it is preferred that the masterbatch polyester composition contains 50 to 200 ppm by mass of tin atoms. When a germanium compound is used, it is preferred that the masterbatch polyester composition contains 50 to 200 ppm by mass of germanium atoms. Among these metal polymerization catalysts, in the case of an antimony compound, an aluminum compound, a titanium compound, or a tin compound, the polymerization catalyst remains in the polyester composition in almost the amount as added. However, a germanium compound may be distilled away from the polymerization system in a reduced pressure environment, and thus it is desirable to adjust the addition amount so that the remaining amount in the polyester composition is within the above range.

A polymerization catalyst of the polyester can be added to the reaction system in an arbitrary stage of the polymerization reaction. For example, the polymerization catalyst can be added to the reaction system, prior to the esterification or transesterification reaction and in an arbitrary stage in the middle of the reaction, immediately before the polycondensation reaction, or in an arbitrary stage in the middle of the polycondensation reaction.

Examples of the dicarboxylic acid include saturated aliphatic dicarboxylic acids typified by oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid and dimer acid, and their ester-forming derivatives, unsaturated aliphatic dicarboxylic acids typified by fumaric acid, maleic acid and itaconic acid, and their ester-forming derivatives, and aromatic dicarboxylic acids typified by orthophthalic acid, isophthalic acid, terephthalic acid, 5-(alkali metal)sulfoisophthalic acid, diphenic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid, and their ester-forming derivatives.

Examples of polycarboxylic acids other than these dicarboxylic acids include ethanetricarboxylic acid, propanetricarboxylic acid, butanetetracarboxylic acid, pyromellitic acid, trimellitic acid, trimesic acid, 3,4,3',4'-biphenyltetracarboxylic acid, and their ester-forming derivatives.

Examples of the glycol include aliphatic glycols typified by alkylene glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol and 1,12-dodecanediol, polyethylene glycol, polytrimethylene glycol, and polytetramethylene glycol; and aromatic glycols typified by hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, and glycols obtained by adding ethylene oxide to those glycols.

Examples of polyhydric alcohols other than these glycols include trimethylolmethane, trimethylolethane, trimethylolpropane, pentaerythritol, glycerol, and hexanetriol.

Examples of hydroxycarboxylic acids include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, and their ester-forming derivatives.

Examples of the cyclic esters include ε-caprolactone, β-propiolactone, β-methyl-β-propiolactone, δ-valerolactone, glycolide, and lactide.

Examples of the ester-forming derivatives of the polycarboxylic acids and hydroxycarboxylic acids include their alkyl esters, acid chlorides, and acid anhydrides.

Polyesters to be used in the present invention are preferably polyethylene terephthalate, polybutylene terephthalate, polypropylene terephthalate, poly(1,4-cyclohexanedimethylene terephthalate), polyethylene naphthalate, polybutylene naphthalate, polypropylene naphthalate, and their copolymers, and polyethylene terephthalate and its copolymers are particularly preferable.

In the masterbatch polyester composition of the present invention, one kind or two or more kinds of additives such as a diethylene glycol suppressant, a fluorescent brightening agent, a color adjusting agent such as a dye and a pigment, an ultraviolet inhibitor, an infrared absorbing dye, a heat stabilizer, a surfactant and an antioxidant can be incorporated, depending on the purpose of use. Examples of the usable diethylene glycol suppressant include basic compounds such as alkylamine compounds and ammonium salt compounds, examples of the usable antioxidant include aromatic amine antioxidants and phenol antioxidants, and examples of the usable stabilizer include sulfur stabilizers and amine stabilizers.

Such additives can be added to the masterbatch polyester composition preferably in a proportion of not more than 10% by mass in total, and more preferably in a proportion of not more than 5% by mass.

The masterbatch polyester composition of the present invention preferably has a color hue (Co-b) of the pellet of 0 to 40, and more preferably 0 to 30. The masterbatch polyester composition is mixed with a polyester resin for a film raw material, thereby being formed into a polyester composition for a film, and then into a film. Even when the masterbatch polyester composition has a relatively high value of color hue (Co-b) of the pellet, there is no problem if the masterbatch polyester composition is diluted with the polyester resin for a film raw material, and the color hue as a film is in the preferable range.

The masterbatch polyester composition of the present invention preferably has an intrinsic viscosity (IV) of 0.3 to 0.7 dl/g. The masterbatch polyester composition is mixed with a polyester resin for a film raw material, thereby being formed into a polyester composition for a film, and then into a film. Even when the masterbatch polyester composition has a relatively high value or low value of intrinsic viscosity (IV) of the pellet, there is no problem if the masterbatch polyester composition is diluted with the polyester resin for a film raw material, and the intrinsic viscosity (IV) as a film is in the preferable range.

[Polyester Composition for Film]

The polyester composition for a film of the present invention is obtained by mixing the masterbatch polyester composition with a polyester resin (composition) for a film raw material at an arbitrary ratio.

The polyester resin (composition) for a film raw material does not have to contain or may contain an alkali metal compound or alkaline earth metal compound for lowering melt resistivity. When the masterbatch polyester composition of the present invention is mixed with the polyester resin for a film raw material without containing an alkali metal compound or alkaline earth metal compound and having high melt resistivity, the mixture can achieve film-forming properties equal to or higher than those of a general polyester composition for a film. When the masterbatch polyester composition of the present invention is mixed with the polyester composition for a film raw material already containing an alkali metal compound or alkaline earth metal compound, film-forming properties of the mixture can be further enhanced.

The polyester usable for the polyester resin (composition) for a film raw material is the same as the one usable for the masterbatch polyester composition. In a preferred aspect, the polyester used in the polyester resin (composition) for a film raw material and the polyester used in the masterbatch polyester composition contain the same constituents.

It is desirable that the amount of magnesium atoms is 15 to 150 ppm, the amount of alkali metal is 1.5 to 15 ppm, and the amount of phosphorus atoms is 7 to 80 ppm, in the polyester composition for a film. Specifically, it is preferred to use a polyester composition for a film containing 1 to 20% by mass of the masterbatch polyester composition of the present invention, and it is more preferred to use a polyester composition for a film containing 2 to 10% by mass of the masterbatch polyester composition. When the masterbatch polyester composition is mixed in an amount within the above ranges, a film that is excellent in the balance of melt resistivity, color hue and heat resistance can be obtained. The color hue (Co-b) in the film is preferably 0 to 6, more preferably 0 to 5.2, and further preferably 0 to 5, when measured by the method described in the section of Examples.

EXAMPLES

The present invention is more specifically described with reference to examples hereinbelow, but the present invention is not limited to the examples. The measurement methods of main characteristic values are described below.

(1) Intrinsic Viscosity (IV) of Polyester Resin/Composition

A polyester composition was dissolved using a 6/4 (weight ratio) mixed solvent of phenol/i, 1,2,2-tetrachloroethane, and the intrinsic viscosity (IV) was measured at a temperature of 30° C.

(2) Melt Resistivity

Two electrodes (stainless wire with a diameter of 0.6 mm) were arranged at both ends of the polyester composition melted at 275° C., and a uniform layer of a molten polyester composition with a width of 2 cm and a thickness of 0.6 mm was formed while being sandwiched between two quartz plates with a width of 2 cm. An electric current (io) when a DC voltage of 120 V was applied was measured, and assigned to the following formula to give a melt resistivity value $\rho i$ ($\Omega \cdot cm$).

$$\rho i\ (\Omega\cdot cm) = (A/L) \times (V/io)$$

[A: electrode area ($cm^2$), L: distance between electrodes (cm), V: voltage (V)]

A ($cm^2$)=[width of molten polyester composition layer]×[thickness]=2 (cm)×0.06 (cm), and V=120 (V). L was measured without including the diameter of the electrodes.

(3) Method of Quantitatively Determining Magnesium, Potassium, Lithium and Phosphorus A polyester composition was heated and melted to [melting point+20° C.] in a stainless circular ring with a thickness of 5 mm and an inner diameter of 50 mm to prepare a sample piece, and the element amount was obtained by fluorescent X-ray analysis and represented in ppm (mass basis). In the quantitative determination, a calibration curve preliminarily obtained from each sample with a known element amount was used.

(4) IMA of Polyester Composition

IMA measurement was carried out according to the description of the measurement method of IMA. The method is supplemented hereinbelow.

One pellet of a masterbatch polyester composition was sandwiched between two cover glasses (MATSUNAMI Microcover glass, 25 mm×25 mm, 0.2 mm in thickness), heated and melted on a hot plate at about 300° C., pressed into a thickness of 0.8 to 0.9 mm, and then immediately cooled rapidly to form a sheet for observation. Using a phase contrast microscope (manufactured by Nikon Corporation) and an objective lens (manufactured by Nikon Corporation, magnification of 10, aperture of 0.5), the center part in the thickness of the sample was observed. An image was captured into an image analyzer (manufactured by Nireco Corporation, Luzex-FS) via a CCD camera and analyzed to measure the number of particles of not less than 10 μm. The same measurement was conducted 20 times while varying the visual field, and the total number of particles was determined. Then, the number of particles of not less than 10 μm per 1 mm square of visual field area was calculated, and the calculated number was regarded as IMA of the masterbatch polyester composition.

(5) Color Hue (Co-b)

The color difference (L, a, b) of a pellet or film of the polyester composition was measured using a color difference meter (manufactured by NIPPON DENSHOKU INDUSTRIES Co., Ltd., ZE-2000). The pellet was put in a measuring cell and measured by a reflection method. Ten sheets of the films were stacked and measured by a reflection method.

(6) Heat Resistance

A polyester film formed by mixing a masterbatch polyester composition was put into a glass ampoule, and after nitrogen purge, the glass ampoule was sealed under a reduced pressure of 13.3 kPa (nitrogen atmosphere). The intrinsic viscosity before and after heat treatment when heat-treating the film at 300° C. for 2 hours was measured. Heat resistance is represented by decrease in intrinsic viscosity by heat treatment (ΔIV=[IV after heat treatment]−[IV before heat treatment]). Usually, intrinsic viscosity is reduced by heat treatment, and thus, the smaller the absolute value of ΔIV is, the better the heat resistance is.

(Reference Example 1) Production of Polyester Resin (X) for Film Raw Material

A stainless steel autoclave equipped with a stirrer, a distillation column and a pressure regulator was charged with terephthalic acid, ethylene glycol, and 0.54 parts by weight of diantimony trioxide. Further, 0.3 mol % of triethylamine was added to terephthalic acid, and the mixture was subjected to an esterification reaction for 2 hours while water formed by esterification was removed successively at 240° C. at a gauge pressure of 0.35 MPa.

Subsequently, the temperature of the system was raised up to 280° C. over 1 hour, and the pressure of the system was reduced slowly to 150 Pa during that period. Under this condition, a polycondensation reaction was carried out for 1 hour to give a polyester resin (X) for a film raw material. The resulting polyester resin had an intrinsic viscosity of 0.62 dl/g, and a melt resistivity of $3.2 \times 10^8$ Ω·cm.

Example 1

(1) Production of Masterbatch Polyester Composition

A stainless steel autoclave equipped with a stirrer, a distillation column and a pressure regulator was charged with terephthalic acid and ethylene glycol. Further, 0.3 mol % of triethylamine was added to terephthalic acid, and the mixture was subjected to an esterification reaction in accordance with an ordinary method to give an oligomer.

Subsequently, basic aluminum acetate, magnesium acetate dihydrate, potassium acetate, and triethyl phosphate were added so as to be 30 ppm as aluminum atoms, 500 ppm as magnesium atoms, 50 ppm as potassium atoms and 330 ppm as phosphorus atoms, respectively, relative to a theoretical amount of polyester. Then, the temperature of the system was raised up to 280° C. over 1 hour, and the pressure of the system was reduced slowly to 150 Pa during that period. Under this condition, a polycondensation reaction was carried out for 80 minutes to give a pellet of the masterbatch polyester composition. Physical properties of the resulting polyester composition are shown in Table 1.

(2) Formation of Polyester Film

Pellets of the masterbatch polyester composition produced above and pellets of the polyester resin (X) for a film raw material were mixed in a mass ratio of 1:9, and the mixture was vacuum-dried at 135° C. for 10 hours.

Subsequently, the resulting substance was metered and fed to a twin-screw extruder, melt-extruded into a sheet form at 280° C., and rapidly cooled and solidified on a metal roll whose surface temperature was kept at 20° C. to give a cast film with a thickness of 1400 μm.

Next, this cast film was heated to 100° C. with a heated roll group and an infrared heater, and then stretched 3.5 times in the longitudinal direction with a group of rolls differing in peripheral speed to give a uniaxially oriented film. Subsequently, the resulting film was stretched 4.0 times in the width direction at 120° C. with a tenter, heated at 260° C. for 0.5 seconds with an infrared heater while the film width was fixed, and further subjected to relaxation treatment of 3% at 200° C. for 23 seconds to give a biaxially oriented polyester film with a thickness of 100 μm. Physical properties of the resulting film are shown in Table 1.

Example 2

A pellet of the masterbatch polyester composition was obtained in the same method as in Example 1 except that basic aluminum acetate, magnesium acetate dihydrate, potassium acetate, and triethyl phosphate were added so as to be 60 ppm as aluminum atoms, 1000 ppm as magnesium atoms, 100 ppm as potassium atoms and 660 ppm as phosphorus atoms, respectively, relative to a theoretical amount of polyester. Physical properties of the resulting polyester composition are shown in Table 1.

A polyester film was obtained by producing a film in the same method as in Example 1 except using the masterbatch polyester composition produced above and pellets of the polyester resin (X) for a film raw material were mixed in a mass ratio of 1:19. Physical properties of the resulting film are shown in Table 1.

Example 3

A pellet of the masterbatch polyester composition was obtained in the same method as in Example 1 except that basic aluminum acetate, magnesium acetate dihydrate, potassium acetate, and triethyl phosphate were added so as to be 70 ppm as aluminum atoms, 1500 ppm as magnesium atoms, 150 ppm as potassium atoms and 990 ppm as phosphorus atoms, respectively, relative to a theoretical amount of polyester. Physical properties of the resulting polyester composition are shown in Table 1.

A polyester film was obtained by producing a film in the same method as in Example 1 except using the masterbatch polyester composition produced above and pellets of the polyester resin (X) for a film raw material were mixed in a mass ratio of 1:29. Physical properties of the resulting film are shown in Table 1.

Example 4

A pellet of the masterbatch polyester composition was obtained in the same method as in Example 1 except that basic aluminum acetate, magnesium acetate dihydrate, potassium acetate, and triethyl phosphate were added so as to be 80 ppm as aluminum atoms, 2500 ppm as magnesium atoms, 250 ppm as potassium atoms and 1650 ppm as phosphorus atoms, respectively, relative to a theoretical amount of polyester. Physical properties of the resulting polyester composition are shown in Table 1.

A polyester film was obtained by producing a film in the same method as in Example 1 except using the masterbatch polyester composition produced above and pellets of the polyester resin (X) for a film raw material were mixed in a mass ratio of 1:49. Physical properties of the resulting film are shown in Table 1.

Example 5

A pellet of the masterbatch polyester composition was obtained in the same method as in Example 1 except that basic aluminum acetate, magnesium acetate dihydrate, potassium acetate, and tripropyl phosphate were added so as to be 30 ppm as aluminum atoms, 500 ppm as magnesium atoms, 50 ppm as potassium atoms and 330 ppm as phosphorus atoms, respectively, relative to a theoretical amount of polyester. Physical properties of the resulting polyester composition are shown in Table 1.

A polyester film was obtained by producing a film in the same method as in Example 1 except using the masterbatch polyester composition produced above and pellets of the polyester resin (X) for a film raw material were mixed in a mass ratio of 1:9. Physical properties of the resulting film are shown in Table 1.

Example 6

A pellet of the masterbatch polyester composition was obtained in the same method as in Example 1 except that basic aluminum acetate, magnesium acetate dihydrate, potassium acetate, and tributyl phosphate were added so as to be 30 ppm as aluminum atoms, 500 ppm as magnesium atoms, 50 ppm as potassium atoms and 330 ppm as phosphorus atoms, respectively, relative to a theoretical amount of polyester. Physical properties of the resulting polyester composition are shown in Table 1.

A polyester film was obtained by producing a film in the same method as in Example 1 except using the masterbatch polyester composition produced above and pellets of the polyester resin (X) for a film raw material were mixed in a mass ratio of 1:9. Physical properties of the resulting film are shown in Table 1.

Example 7

A pellet of the masterbatch polyester composition was obtained in the same method as in Example 1 except that basic aluminum acetate, magnesium acetate dihydrate, lithium acetate dihydrate, and triethyl phosphate were added so as to be 30 ppm as aluminum atoms, 500 ppm as magnesium atoms, 45 ppm as lithium atoms and 330 ppm as phosphorus atoms, respectively, relative to a theoretical amount of polyester. Physical properties of the resulting polyester composition are shown in Table 1.

A polyester film was obtained by producing a film in the same method as in Example 1 except using the masterbatch polyester composition produced above and pellets of the polyester resin (X) for a film raw material were mixed in a mass ratio of 1:9. Physical properties of the resulting film are shown in Table 1.

Example 8

A pellet of the masterbatch polyester composition was obtained in the same method as in Example 1 except that basic aluminum acetate, magnesium acetate dihydrate, potassium acetate, and ethyl diethylphosphonoacetate were added so as to be 30 ppm as aluminum atoms, 500 ppm as magnesium atoms, 50 ppm as potassium atoms and 250 ppm as phosphorus atoms, respectively, relative to a theoretical amount of polyester. Physical properties of the resulting polyester composition are shown in Table 1.

A polyester film was obtained by producing a film in the same method as in Example 1 using the masterbatch polyester composition produced above and pellets of the polyester resin (X) for a film raw material were mixed in a mass ratio of 1:9. Physical properties of the resulting film are shown in Table 1.

Comparative Example 1

A pellet of the masterbatch polyester composition was obtained in the same method as in Example 1 except that basic aluminum acetate, magnesium acetate dihydrate, potassium acetate, and triethyl phosphate were added so as to be 30 ppm as aluminum atoms, 500 ppm as magnesium atoms, 50 ppm as potassium atoms and 200 ppm as phosphorus atoms, respectively, relative to a theoretical amount of polyester. Physical properties of the resulting polyester composition are shown in Table 2.

A polyester film was obtained by producing a film in the same method as in Example 1 using the masterbatch polyester composition produced above and pellets of the polyester resin (X) for a film raw material were mixed in a mass ratio of 1:9. Physical properties of the resulting film are shown in Table 2.

Comparative Example 2

A pellet of the masterbatch polyester composition was obtained in the same method as in Example 1 except that basic aluminum acetate, magnesium acetate dihydrate, potassium acetate, and triethyl phosphate were added so as to be 30 ppm as aluminum atoms, 500 ppm as magnesium atoms, 50 ppm as potassium atoms and 670 ppm as phosphorus atoms, respectively, relative to a theoretical amount of polyester. Physical properties of the resulting polyester composition are shown in Table 2.

A polyester film was obtained by producing a film in the same method as in Example 1 using the masterbatch polyester composition produced above and pellets of the polyester resin (X) for a film raw material were mixed in a mass ratio of 1:9. Physical properties of the resulting film are shown in Table 2.

Comparative Example 3

A pellet of the masterbatch polyester composition was obtained in the same method as in Example 1 except that basic aluminum acetate, magnesium acetate dihydrate, potassium acetate, and triethyl phosphate were added so as to be 30 ppm as aluminum atoms, 500 ppm as magnesium atoms, 350 ppm as potassium atoms and 330 ppm as phosphorus atoms, respectively, relative to a theoretical amount of polyester. Physical properties of the resulting polyester composition are shown in Table 2.

A polyester film was obtained by producing a film in the same method as in Example 1 using the masterbatch polyester composition produced above and pellets of the polyester resin (X) for a film raw material were mixed in a mass ratio of 1:9. Physical properties of the resulting film are shown in Table 2.

Comparative Example 4

A pellet of the masterbatch polyester composition was obtained in the same method as in Example 1 except that basic aluminum acetate, magnesium acetate dihydrate, potassium acetate, and trimethyl phosphate were added so as to be 30 ppm as aluminum atoms, 500 ppm as magnesium atoms, 50 ppm as potassium atoms and 330 ppm as phosphorus atoms, respectively, relative to a theoretical amount of polyester. Physical properties of the resulting polyester composition are shown in Table 2.

A polyester film was obtained by producing a film in the same method as in Example 1 using the masterbatch polyester composition produced above and pellets of the polyester resin (X) for a film raw material were mixed in a mass ratio of 1:9. Physical properties of the resulting film are shown in Table 2.

TABLE 1

| | Item | Example 1 | Example 2 | Example 3 | Example 4 | Example 5 | Example 6 | Example 7 | Example 8 |
|---|---|---|---|---|---|---|---|---|---|
| Physical properties of masterbatch polyester composition | Mg [ppm] | 500 | 1000 | 1500 | 2500 | 500 | 500 | 500 | 500 |
| | Alkali metal [ppm] | 50 | 100 | 150 | 250 | 50 | 50 | 45 | 50 |
| | P [ppm] | 250 | 500 | 750 | 1300 | 250 | 250 | 250 | 250 |
| | (m + k/2)/p [mol/mol] | 2.6 | 2.6 | 2.6 | 2.5 | 2.6 | 2.6 | 2.9 | 2.6 |
| | Alkali metal species | K | K | K | K | K | K | Li | K |
| | Phosphorus compound * | TEPA | TEPA | TEPA | TEPA | TPPA | TBPA | TEPA | EDPA |
| | IV [dL/g] | 0.56 | 0.51 | 0.48 | 0.36 | 0.57 | 0.57 | 0.61 | 0.58 |
| | $\rho i$ [× $10^8$ Ω · cm] | 0.019 | 0.011 | 0.009 | 0.008 | 0.022 | 0.023 | 0.025 | 0.015 |
| | Co-b | 12.2 | 18.3 | 25.5 | 29.3 | 15.8 | 17.7 | 19.4 | 19.5 |
| | IMA | 0 | 0 | 1 | 6 | 2 | 3 | 0 | 8 |
| Polyester composition for film | Masterbatch composition [wt %] | 10 | 5 | 3.3 | 2 | 10 | 10 | 10 | 10 |
| | Polyester resin (X) [wt %] | 90 | 95 | 96.7 | 98 | 90 | 90 | 90 | 90 |
| | $\rho i$ [× $10^8$ Ω · cm] | 0.21 | 0.22 | 0.20 | 0.22 | 0.22 | 0.24 | 0.25 | 0.17 |
| Film evaluation | IV before heat treatment [dl/g] | 0.58 | 0.57 | 0.58 | 0.59 | 0.58 | 0.57 | 0.56 | 0.55 |
| | IV after heat treatment [dl/g] | 0.42 | 0.42 | 0.43 | 0.43 | 0.40 | 0.39 | 0.36 | 0.35 |
| | Heat resistance ΔIV [dl/g] | −0.16 | −0.15 | −0.15 | −0.16 | −0.18 | −0.18 | −0.20 | −0.20 |
| | Co-b | 4.6 | 4.3 | 4.5 | 4.4 | 4.8 | 5.1 | 5.3 | 5.3 |

* TMPA = Trimethyl phosphate
* TEPA = Triethyl phosphate
* TPPA = Tripropyl phosphate
* TBPA = Tributyl phosphate
* EDPA = Ethyl diethylphosphonoacetate

TABLE 2

| | Item | Comparative Example 1 | Comparative Example 2 | Comparative Example 3 | Comparative Example 4 |
|---|---|---|---|---|---|
| Physical properties of masterbatch polyester composition | Mg [ppm] | 500 | 500 | 500 | 500 |
| | Alkali metal [ppm] | 50 | 50 | 350 | 50 |
| | P [ppm] | 150 | 500 | 250 | 250 |
| | (m + k/2)/p [mol/mol] | 4.4 | 1.3 | 3.1 | 2.6 |
| | Alkali metal species | K | K | K | K |
| | Phosphorus compound * | TEPA | TEPA | TEPA | TMPA |
| | IV [dL/g] | 0.58 | 0.54 | 0.59 | 0.54 |
| | $\rho i$ [× $10^8$ Ω · cm] | 0.034 | 0.052 | 0.018 | 0.060 |
| | Co-b | 32.1 | 9.8 | 25.4 | 10.2 |
| | IMA | 20 | 0 | 1 | 60 |
| Polyester composition for film | Masterbatch composition [wt %] | 10 | 10 | 10 | 10 |
| | Polyester resin (X) [wt %] | 90 | 90 | 90 | 90 |
| | $\rho i$ [× $10^8$ Ω · cm] | 0.33 | 0.51 | 0.20 | 0.58 |
| Film evaluation | IV before heat treatment [dl/g] | 0.55 | 0.59 | 0.56 | 0.58 |
| | IV after heat treatment [dl/g] | 0.30 | 0.47 | 0.35 | 0.43 |
| | Heat resistance ΔIV [dl/g] | −0.25 | −0.12 | −0.21 | −0.15 |
| | Co-b | 6.6 | 4.3 | 6.1 | 4.4 |

* TMPA = Trimethyl phosphate
* TEPA = Triethyl phosphate
* TPPA = Tripropyl phosphate
* TBPA = Tributyl phosphate
* EDPA = Ethyl diethylphosphonoacetate The masterbatch polyester compositions of Examples 1 to 6 have a low melt resistivity and little contaminant, and a film obtained using these masterbatch polyester compositions are excellent in color hue and thermal stability. The masterbatch polyester composition of Example 7 contains lithium as the alkali metal, and it has slightly higher melt resistivity as compared to Example 1, and is slightly inferior in color hue. The masterbatch polyester composition of Example 8 contains ethyl diethylphosphonoacetate as the phosphorus compound, and it has a slightly larger amount of contaminant as compared to Examples 1, 5 and 6, and is slightly inferior in color hue.

The masterbatch polyester composition of Comparative Example 1 contains a small amount of phosphorus compound, and thus is deteriorated in color hue, and has a larger amount of contaminant as compared to Example 1 with the same amount of magnesium, and the obtained film is deteriorated in heat resistance. The masterbatch polyester composition of Comparative Example 1 also has high melt resistivity, and is deteriorated in film-forming properties. Comparative Example 2 has high melt resistivity, and is deteriorated in film-forming properties. Comparative Example 3 contains a large amount of the potassium compound, and thus is deteriorated in color hue as compared to Example 1 with the same amount of magnesium, and the obtained film is deteriorated in heat resistance. Comparative Example 4 has high melt resistivity, and is deteriorated in film-forming properties.

INDUSTRIAL APPLICABILITY

The masterbatch polyester composition of the present invention has sufficiently low melt resistivity, little contaminant and are also excellent in color hue and thermal stability, and thus the present invention has an effect that a polyester film having improved film-forming properties, and also excellent quality can be produced by mixing this masterbatch polyester composition with the polyester for a film raw material. Accordingly, a film obtained using the masterbatch polyester composition of the present invention can be used for a wide variety of applications, e.g., antistatic films, easily adhesive films, cards, dummy cans, agriculture uses, construction materials, decorative materials, wall paper, OHP films, printing, ink jet recording, sublimation transfer recording, recording by laser beam printers, electrophotographic recording, thermal transfer recording, heat sensitive transfer recording, printed circuit board, membrane switches, near-infrared absorbing films for plasma displays, transparent electroconductive films for touch panels or electroluminescence, masking films, photographic plate-making, roentgen films, photographic negative films, phase difference films, polarization films, polarization film protection (TAC), protect films and/or separator films for inspection of deflection plates and retarders, photosensitive resin films, visible field magnifying films, diffusion sheets, reflection films, antireflection films, ultraviolet protection, and back grinding tapes.

The invention claimed is:

1. A polyester composition for a masterbatch, which comprises a polyester, a magnesium compound, an alkali metal compound and a phosphorus compound, wherein 450 to 2700 ppm by mass as magnesium atoms, 40 to 270 ppm by mass as alkali metal atoms and 200 to 1700 ppm by mass as phosphorus atoms are contained in the polyester composition, and satisfies following (1) and (2):

melt resistivity of the polyester composition=0.005×$10^8$ to $0.05×10^8$ Ω·cm (1)

IMA≤10, (2)

wherein IMA is a number of contaminant particles with a particle size of 10 μm or more per 1 $mm^2$ of a visual field area observed from a sheet consisting of the polyester composition.

2. The polyester composition for a masterbatch according to claim 1, wherein the polyester in a polyester containing a dicarboxylic acid component and a glycol component as constituents, taking the amount of magnesium atoms as m (mol %), the amount of alkali metal atoms as k (mol %), and the amount of phosphorus atoms as p (mol %), based on the amount of the dicarboxylic acid component and satisfy the following formula (3):

2≤(m+k/2)/p≤3. (3)

3. The polyester composition for a masterbatch according to claim 2, wherein the alkali metal compound is potassium.

4. The polyester composition for a masterbatch claim 3, wherein the phosphorus compound is a phosphoric acid trialkyl ester and the trialkyl ester has alkyl groups having 2 to 4 carbon atoms.

5. The polyester composition for a masterbatch according claim 3, wherein the phosphorus compound is a triethyl phosphate.

6. The polyester composition for a masterbatch according to claim 1, wherein the alkali metal compound is potassium.

7. The polyester composition for a masterbatch according to claim 6, wherein the phosphorus compound is a phosphoric acid trialkyl ester and the trialkyl ester has alkyl groups having 2 to 4 carbon atoms.

8. The polyester composition for a masterbatch according to claim 6, wherein the phosphorus compound is a triethyl phosphate.

9. The polyester composition for a masterbatch according to claim 2, wherein the phosphorus compound is a phosphoric acid trialkyl ester and the trialkyl ester has alkyl groups having 2 to 4 carbon atoms.

10. The polyester composition for a masterbatch according to claim 2, wherein the phosphorus compound is a triethyl phosphate.

11. The polyester composition for a masterbatch according to claim 1, wherein the phosphorus compound is a phosphoric acid trialkyl ester and the trialkyl ester has alkyl groups having 2 to 4 carbon atoms.

12. The polyester composition for a masterbatch according to claim 1, wherein the phosphorus compound is a triethyl phosphate.

13. A polyester composition for a film, wherein the polyester composition comprises the masterbatch polyester composition according to claim 1.

14. A polyester composition for a film, wherein the polyester composition comprises the masterbatch polyester composition according to claim 2.

15. A polyester composition for a film, wherein the polyester composition comprises the masterbatch polyester composition according to claim 4.

16. A polyester composition for a film, wherein the polyester composition comprises the masterbatch polyester composition according to claim 5.

17. A polyester film consisting of the polyester composition for a film according to claim 13.

18. A polyester film consisting of the polyester composition for a film according to claim 14.

19. A polyester film consisting of the polyester composition for a film according to claim 15.

20. A polyester film consisting of the polyester composition for a film according to claim 16.

* * * * *